Figure 3:
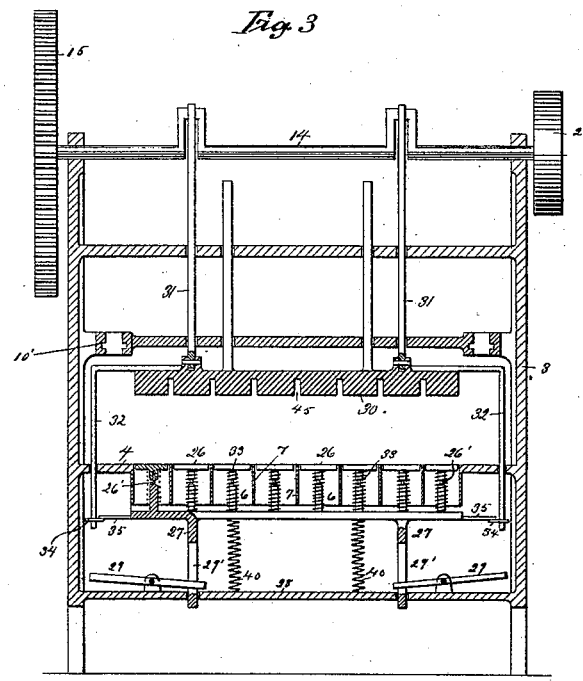

(No Model.) 2 Sheets—Sheet 1.
D. H. CLOSE.
PROCESS OF MANUFACTURING BRICK.
No. 430,376. Patented June 17, 1890.
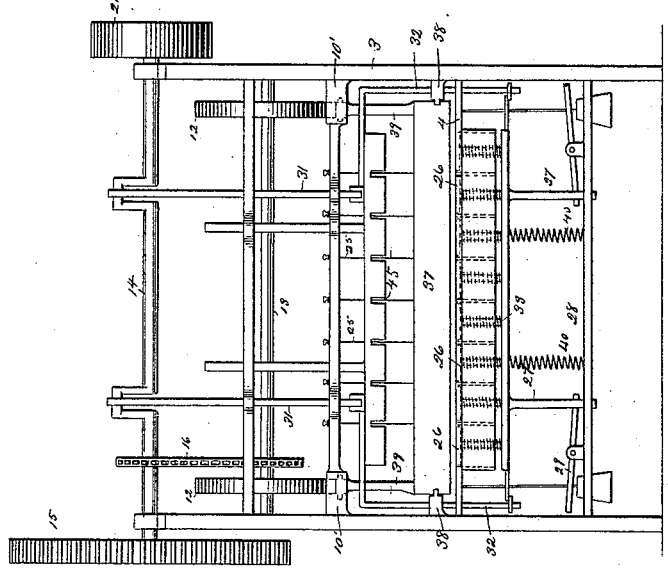
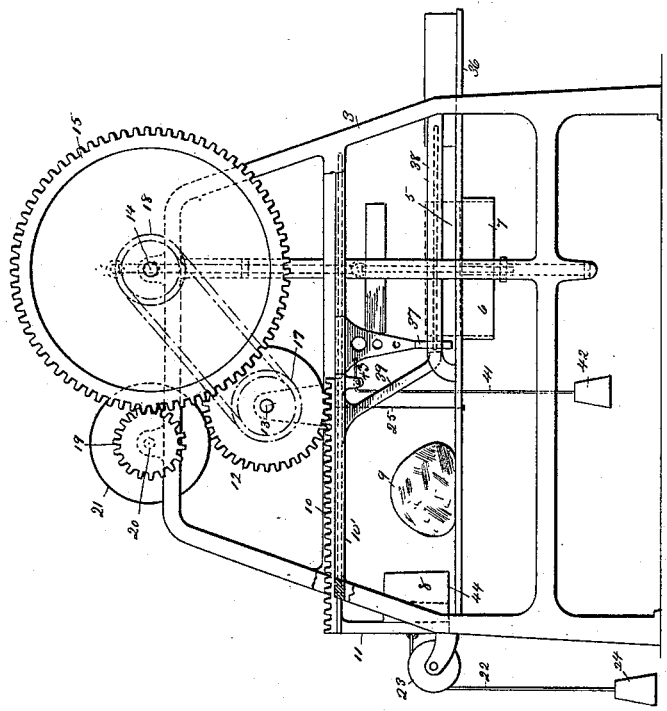
Witnesses:
Chas. B. Shumway
D. N. Naylor
Inventor
D. H. Close
By E. W. Cady
Atty.

(No Model.) 2 Sheets—Sheet 2.

D. H. CLOSE.
PROCESS OF MANUFACTURING BRICK.

No. 430,376. Patented June 17, 1890.

Witnesses:
Chas. B. Shumway
D. H. Naylor

Inventor
D. H. Close
By E. W. Cady
Atty.

UNITED STATES PATENT OFFICE.

DANIEL H. CLOSE, OF NEW YORK, N. Y.

PROCESS OF MANUFACTURING BRICK.

SPECIFICATION forming part of Letters Patent No. 430,376, dated June 17, 1890.

Application filed November 15, 1889. Serial No. 330,396. (No specimens.)

*To all whom it may concern:*

Be it known that I, DANIEL H. CLOSE, of the city, county, and State of New York, have invented an Improved Method of Manufacturing Brick, of which the following is a specification.

This invention relates to the manufacture of brick, and has especial reference to the method of making brick where a column of clay is pressed out of or through the die of an auger or plunger machine.

In the making of bricks by this method clay is carefully pushed through an opening called a "die," which opening is exactly the shape of the brick required. When sufficient clay has passed through the opening, it is cut off into sections by wires, which bricks are known on the market as "wire-cut" bricks, but sometimes are called "end-cut" and at other times "side-cut" bricks, according to the shape of the die through which the clay is passed. These styles or makes of bricks are open to the following objections: First, in the auger brick-machine clay is pushed out in layers, thereby doing what is called "laminating the bricks," causing them to twist and turn in burning and sometimes crack and fall apart after burning while being handled, which is a serious defect. In the plunger-machine this does not occur; but this type of machine has the following objections in common with the auger-machine: The clay in passing through the smooth dies becomes glazed wherever it touches the die, which glaze, when dried, cracks, owing to the fact that the clay nearest the die is pressed harder than the center of the column of clay, and the different densities of the clay cause it to dry unequally, and hence to crack, as above stated. Wire-cut bricks always have sharp rough edges left by the cutting-wires. Only special kinds of clay can be worked on these machines. The clay must be free from anything that may destroy the edges or corners while passing through the dies, and also which would interfere with the wires when cutting a column of clay. Small stones, shells, roots, and the different oxides found in clay all make it difficult, if not impossible, to use clays containing them, and most do to a greater or less extent.

This invention has for its object to obviate the above-mentioned objections; and it consists in a process of manufacturing bricks, as hereinafter described and claimed.

In carrying out this invention I employ a die of an irregular shape without corners in connection with an auger or plunger machine. A column of clay is run into this machine when sufficient clay is cut from the column with a knife or any other suitable instrument. This detached piece is then carried forward and cut into sections by vertical wires, and the sections are further carried onto a set of molds or dies sunk in the bottom of the machine. These dies or molds are just the size of the bricks required; but the sections of clay which are carried forward over these molds are entirely of a different shape, being just sufficient for the number of bricks required for the mold, but being higher and shorter in size than the molds. The object of this shape of the sections of clay is that when they are pushed down into the molds their original shape will be entirely destroyed, thereby breaking up any lamination or unequally-pressed portions, but pressing all parts equally and much harder than before. The partitions of the molds are knives, which cut the clay into sections in case the wires for any reason fail to do so. In order to tear up and destroy any smoothness in the sides of the column of clay which may occur while being pushed through the die, small protuberances, pins, or hooks are placed in the die. The shape of the column of clay being without corners will leave the finished bricks without any marks. The bricks will have no rough edges such as are left by the cutting-wires in the other form of machine, and almost any kind of clay can be used.

To illustrate the manner of carrying out the hereinbefore-described process, I have shown a machine for carrying out this invention in the accompanying drawings, in which—

Figure 4:
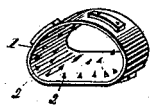

Figure 1 is a side view of the machine. Fig. 2 is a front view. Fig. 3 is a vertical cross-section, and Fig. 4 is a perspective view of the dies.

Referring to the accompanying drawings, in which similar numerals of reference refer to like parts in the several figures, 1 indicates a die formed of an oval or other irregular shape in cross-section without corners. The inner surface of the die is provided with hooks 2 or other suitable projections, which tear the sides of a column of clay forced through the die, and thereby destroy any smoothness which may occur in the sides of the column of clay. Mounted in a suitable frame 3 is a table 4, provided with an opening 5, from which depends a die or mold or number of dies or molds, as desired.

As here shown, a number of dies or molds 6 are employed which are just the size of the brick required. The partitions 7, which separate the molds 6, are preferably steel blades, which serve as knives to cut the irregular-shaped sections of clay pressed into the molds should the wires hereinafter mentioned fail to do so. The molds 6 are formed without top or bottom, and the clay is pressed therein by plungers, the lower ones of which serve as movable bottoms for the molds, as will be hereinafter set forth.

The die 1 in practice is located adjacent to the table 4, so as to deliver the column of clay onto the table adjacent to one side thereof and transversely thereto. After the irregular-shaped column of clay has been pushed across the table it is cut off by a knife or other suitable means and is carried over the table 4 and located endwise over the molds 6 by any suitable feed mechanism. As here shown, a pusher or plunger 8 may be employed, which is located at one side of and is movable over the table 4 to the molds. The pusher 8 is moved forward over the table by means of racks 10, movable in guides 10' on frame 3, connected with the pusher by standards 11, and meshing with mutilated gear-wheels 12, the shaft 13 of which is connected with the shaft 14 of the toothed wheel 15 by an endless belt 16, passing over a grooved pulley 17 on the shaft 13 of the gear-wheel 12 and a grooved pulley 18 on the shaft 14 of the wheel 15. The shaft 14 is driven by means of a gear-wheel 15, meshing with a small gear-wheel 19, mounted on a shaft 20, having a band-wheel 21, which may be connected by a band with suitable power. By means of the mutilated gear-wheels 12 the movement of pusher 8 is so regulated that the column of clay will be moved above the molds and the pusher 8 will be retracted to normal position when the teeth of wheels 12, clearing those of racks 10, are released therefrom, the racks 10 and pusher 8 being drawn back by cords 22, passing over grooved pulleys 23, mounted on the edge of the table and carrying a suspended weight 24 and acting on the pusher 8 to draw it back to normal position.

25 indicates vertical wires extending from the table to the frame-work 3 above, which serve to cut the column of clay 9 into sections as it is moved by the pusher 8 toward the molds 6.

26 indicates plungers which normally are located below the molds 6, thereby serving as bottoms thereto, and are mounted on the upper end of the vertical rods 27, movable in and guided by horizontal bars 28 and engaged adjacent to their lower end by the end of tilting lever-arms 29, pivoted in frame 3 and projecting through slots 29' in the vertical rods 27.

30 indicates a plunger located at a distance above the molds 6 and mounted on the lower ends of rods 31, pivoted on the shaft 14, which is a double-crank shaft.

By the operation of the shaft 14, after the sections of the column of clay 9 have been moved onto the molds 6 by the pusher 8, the plunger 30 is brought down on top of the cut sections of the column of clay 9, pressing them down into the molds 6, so as to fill the latter and be formed into the shape of bricks. At the same time the plunger 30 presses the sections of clay into the molds 6 the plungers 26 are moved down by the sections to the bottom of the molds and then caused to be pressed up against the under side of the clay sections by rods 32, depending from the ends of plunger 30, and carried downward against the uplifted ends of tilting levers 29, pressing them down and causing their other ends to be raised, so as to lift up the rods 27 and press the plungers 26 up against the clay sections, as aforesaid.

The sections of the column of clay 9 are of greater height and less length than the molds 6, so that when the sections are pressed in molds 6, as above described, they are pressed into the shape of bricks.

33 indicates springs connected to the frame-work of plungers 26 and rods 26', above which these plungers are mounted on the upper ends of the springs, by means of which the plungers 26 will yield to any undue strain brought upon them by the action of the plunger 30. Plungers 26 are raised up from the bottom of the molds 6 by projections 34 on the rods 32 engaging projections 35 on the frame-work of plungers 26, thereby lifting the perfect brick out of the mold. To remove the molded-clay sections to the shelf on extension 36 of the table 4, a pusher 37, adapted to move on guides 38 on the frame-work 3, is located at one side of the opening 5, which is moved forward against the molded-clay sections by arms 39, projecting forward from the racks 10 and having their ends located at such a distance from the rear of the pusher 37 as to permit arm 39 to have sufficient forward movement before bearing against and moving pusher 37 against the molded-clay sections to allow the plunger 30 to be raised and the plunger 26 to raise the molded-clay sections out of the molds. In order to hold up the plunger 26 and aid the rods 32 in restoring the plungers 26 to normal position at the top of the molds 6, springs 40 are connected with the frame of plungers 26 and the upper horizontal bars 28 and react by their tension when the plungers 26 have been pressed down to throw them up when released. It will be observed that the pusher 37 is also automatically drawn back by a cord 41 and suspended weight 42, the cord 41 passing over a pulley 43 on the guides 10' of rack-bar 10. It will also be noticed that the plunger 8 is formed with vertical slots or recesses 44 to permit it to pass the vertical wires 25 sufficiently to move the cut sections onto the molds. The plunger 30 is also formed with slots 45 to permit it to pass down below the upper edges of the partitions 7.

While I have set forth and preferably form a column of clay without corners and press the cut sections thereof in molds of greater length and of less height than the cut sections, I desire it to be understood that I may employ the molds with sections cut from a column of clay having corners, the molds being of greater length and less height than the cut sections.

By means of this invention the capacity of auger and plunger machines will be largely increased and the cost of manufacture economized, as the bricks made by my process do not require to be repressed, whereas where bricks have to be repressed, as they now do after having been made by auger and plunger machines, aside from the imperfections hereinbefore mentioned in the bricks, numbers of repress-machines are employed and as many extra gangs of workmen to run them.

I desire to have it understood that a single mold may be employed and a single section may be cut transversely from the column of clay delivered from the die and be automatically moved onto the single mold, if preferred, instead of a number of sections and molds being employed.

Having described my invention, what I claim, and desire to secure protection for by United States Letters Patent, is as follows:

1. The method of manufacturing bricks, which consists in forming a column of clay without smooth sides and of irregular shape in cross-section without corners, cutting the column transversely into sections, pressing the sections into shape of bricks, and delivering the molded sections, substantially as herein set forth.

2. In the manufacture of bricks, substantially as described, forming a column of clay without corners, cutting the column into sections transversely, pressing the sections into the shape of bricks, and delivering the molded sections, substantially as herein set forth.

3. In the manufacture of bricks, substantially as herein described, forming a column of clay without corners, cutting the column into sections transversely, pressing the sections into molds of less height and greater length than the cut sections, and delivering the molded sections, substantially as herein set forth.

4. In the manufacture of bricks, forming a column of clay, cutting the column into sections transversely, pressing the sections into molds of less height and greater length than the sections, and delivering the molded sections, substantially as herein described.

5. In the manufacture of bricks, substantially as herein described, forming a column of clay without corners and simultaneously tearing the surface of the column lengthwise, so as to prevent a smooth surface, substantially as herein set forth.

6. The method of manufacturing brick, substantially as herein described, which consists in forming an unglazed column of clay without corners, automatically moving the column laterally and cutting it into transverse sections, pressing and simultaneously cutting and molding the cut sections into the desired shape of brick, and delivering the molded sections from the molds, substantially as herein set forth.

7. The method of manufacturing brick, which consists in forming a column of clay and delivering it onto a table, automatically moving the column of clay laterally onto the molds, and simultaneously cutting it transversely into sections, pressing and molding the sections, and delivering the molded sections from the molds, substantially as herein set forth.

In testimony whereof I have affixed my signature in presence of two witnesses.

DANIEL H. CLOSE.

Witnesses:
ALLEN MCCULLOH,
EDWARD W. CADY.